US012611922B2

(12) United States Patent
Bobel et al.

(10) Patent No.: US 12,611,922 B2
(45) Date of Patent: Apr. 28, 2026

(54) PATTERNED TWO SHEET SHEAR PANEL CONSTRUCTIONS

(71) Applicant: GM GLOBAL TECHNOLOGY OPERATIONS LLC, Detroit, MI (US)

(72) Inventors: Andrew Clay Bobel, Troy, MI (US); Rajan R. Chakravarty, Troy, MI (US); Amanda Hyde, Warren, MI (US); Varun Agarwal, Bengaluru (IN); Santosh K. Swamy, Bengaluru (IN); Jong-Eun Kim, Macomb, MI (US); Manoj Marella, Bengaluru (IN); Diptak Bhattacharya, Royal Oak, MI (US); Chandra Mohan Reddy Gavireddy, Bengaluru (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 320 days.

(21) Appl. No.: 18/307,486

(22) Filed: Apr. 26, 2023

(65) Prior Publication Data

US 2024/0359548 A1 Oct. 31, 2024

(51) Int. Cl.
B60K 1/04 (2019.01)
B62D 21/03 (2006.01)
B62D 25/20 (2006.01)
B62D 29/00 (2006.01)

(52) U.S. Cl.
CPC ............... B60K 1/04 (2013.01); B62D 21/03 (2013.01); B62D 25/2009 (2013.01); B62D 29/007 (2013.01); B60K 2001/0438 (2013.01)

(58) Field of Classification Search
CPC .. B60K 1/04; B60K 2001/0438; B62D 21/03; B62D 25/2009; B62D 29/007; B62D 25/20; B62D 21/157; B62D 25/025; B60R 16/04
See application file for complete search history.

(56) References Cited

U.S. PATENT DOCUMENTS

| | | | |
|---|---|---|---|
| 4,631,891 | A | 12/1986 | Donavich |
| 9,283,895 | B2 | 3/2016 | Sumi et al. |
| 10,549,795 | B2 | 2/2020 | Ehrlich |

(Continued)

FOREIGN PATENT DOCUMENTS

| | | |
|---|---|---|
| CN | 118850185 A | 10/2024 |
| DE | 102023129860 A1 | 10/2024 |

OTHER PUBLICATIONS

Bobel, Andrew Clay et al, U.S. Appl. No. 17/388,799, filed Jul. 29, 2021 entitled "Structural Assembly with Patterned Panels," 71 pages.

(Continued)

*Primary Examiner* — Syed O Hasan

(57) ABSTRACT

A shear panel construction includes a patterned upper sheet metal panel including a planar section and having a plurality of upwardly protruding portions defining first strengthening crossbar sections extending upward from the planar section, the planar section of the patterned upper sheet metal panel extends to an edge of the patterned upper sheet metal panel. A patterned lower sheet metal panel is secured to a bottom surface of the patterned upper sheet metal panel, the patterned lower sheet metal panel having a plurality of protruding portions defining second strengthening crossbar sections.

18 Claims, 6 Drawing Sheets

(56) References Cited

U.S. PATENT DOCUMENTS

| | | | |
|---|---|---|---|
| 10,886,513 | B2 | 1/2021 | Stephens |
| 11,370,287 | B2 * | 6/2022 | Tsuyuzaki ............ B62D 21/157 |
| 11,462,793 | B2 * | 10/2022 | Kagami ................... B60K 1/04 |
| 11,549,626 | B2 | 1/2023 | Sachdev et al. |
| 11,688,910 | B2 | 6/2023 | Stephens et al. |
| 11,833,914 | B2 | 12/2023 | Collins |
| 11,939,002 | B2 | 3/2024 | Bobel et al. |
| 11,962,030 | B2 | 4/2024 | Pires et al. |
| 11,975,601 | B2 | 5/2024 | Nabuchi et al. |
| 12,083,877 | B2 | 9/2024 | Danneberg et al. |
| 12,224,451 | B2 | 2/2025 | Günther |
| 12,227,065 | B2 | 2/2025 | Janarthanam et al. |
| 12,237,476 | B2 | 2/2025 | Golm et al. |
| 12,434,717 | B2 | 10/2025 | Bobel |
| 2015/0239331 | A1 * | 8/2015 | Rawlinson ............ B62D 21/157 180/68.5 |
| 2017/0021734 | A1 * | 1/2017 | Birkholz ................. B60L 53/12 |
| 2018/0123102 | A1 | 5/2018 | Lomax et al. |
| 2018/0154754 | A1 | 6/2018 | Rowley et al. |
| 2018/0215245 | A1 | 8/2018 | Sudhindra et al. |
| 2020/0350523 | A1 | 11/2020 | Weinmann et al. |
| 2020/0373531 | A1 * | 11/2020 | Dupper ................... B60L 50/64 |
| 2022/0059894 | A1 | 2/2022 | Stephens et al. |
| 2022/0376338 | A1 | 11/2022 | Bobel et al. |
| 2023/0029479 | A1 | 2/2023 | Bobel et al. |
| 2023/0113832 | A1 | 4/2023 | Bobel et al. |
| 2023/0158878 | A1 | 5/2023 | Ota et al. |
| 2023/0299404 | A1 | 9/2023 | Bobel et al. |
| 2024/0234859 | A1 | 7/2024 | Bobel et al. |
| 2024/0308322 | A1 | 9/2024 | Harsch et al. |
| 2024/0359548 | A1 | 10/2024 | Babel et al. |
| 2024/0363949 | A1 | 10/2024 | Bobel et al. |
| 2025/0065704 | A1 | 2/2025 | Apone et al. |

OTHER PUBLICATIONS

Bobel, Andrew Clay et al, U.S. Appl. No. 17/500,641, filed Oct. 13, 2021 entitled "Structural Assembly with Patterned Panels," 92 pages.

Bobel, Andrew Clay et al, U.S. Appl. No. 18/307,468, filed Apr. 26, 2023 entitled "Stackable Battery Module Mounting System," 26 pages.

U.S. Appl. No. 17/500,641, filed Oct. 13, 2021, Bobel et al.

U.S. Appl. No. 17/388,799, filed Jul. 29, 2021, Bobel et al.

* cited by examiner

PATTERNED TWO SHEET SHEAR PANEL CONSTRUCTIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a structural assembly for a vehicle and more particularly to a patterned two sheet shear panel construction.

Vehicle structural assemblies provide structural support and mounting locations for other vehicle components. It is advantageous to improve the strength and structural performance of vehicle components. However, it is also advantageous that components of automobiles or other vehicles be lightweight to improve efficiency. Thus, vehicle components, such as structural assemblies, exhibit both adequate strength during normal service and energy absorption characteristics under extraordinary conditions. The patterned two-sheet shear panel constructions of the present disclosure can be used as a bottom panel of a battery housing, or alternatively, as a panel of a vehicle body undercarriage.

SUMMARY

Further areas of applicability of the present disclosure will become apparent from the detailed description, the claims and the drawings. The detailed description and specific examples are intended for purposes of illustration only and are not intended to limit the scope of the disclosure.

According to an aspect of the present disclosure, a shear panel construction includes a patterned upper sheet metal panel including a planar section and having a plurality of upwardly protruding portions defining first strengthening crossbar sections extending upward from the planar section. The planar section of the patterned upper sheet metal panel extends to an edge of the patterned upper sheet metal panel. A patterned lower sheet metal panel is secured to a bottom surface of the patterned upper sheet metal panel, the patterned lower sheet metal panel having a plurality of protruding portions defining second strengthening crossbar sections.

According to a further aspect of the present disclosure, the patterned upper and lower sheet metal panels are made from one of steel, aluminum, titanium, magnesium and composites thereof.

According to a further aspect of the present disclosure, the patterned lower sheet metal panel is secured to the bottom surface of the patterned upper sheet metal panel by welds.

According to a further aspect of the present disclosure, the patterned lower sheet metal panel includes a plurality of drain holes therein.

According to a further aspect of the present disclosure, the patterned lower sheet metal panel and the patterned upper sheet metal panel have a plurality of aligned bolt holes.

According to another aspect, a vehicle underbody construction includes a vehicle frame and a shear panel construction mounted to the vehicle frame and including a patterned vehicle underbody panel having a shear panel construction includes a patterned upper sheet metal panel including a planar section and having a plurality of upwardly protruding portions defining first strengthening crossbar sections extending upward from the planar section. The planar section of the patterned upper sheet metal panel extends to an edge of the patterned upper sheet metal panel. A patterned lower sheet metal panel is secured to a bottom surface of the patterned upper sheet metal panel, the patterned lower sheet metal panel having a plurality of protruding portions defining second strengthening crossbar sections.

According to a further aspect of the present disclosure, the patterned upper and lower sheet metal panels are made from one of steel, aluminum, titanium, magnesium and composites thereof.

According to a further aspect of the present disclosure, the patterned lower sheet metal panel is secured to the bottom surface of the patterned upper sheet metal panel by welds.

According to a further aspect of the present disclosure, the patterned lower sheet metal panel includes a plurality of drain holes therein.

According to a further aspect of the present disclosure, the patterned lower sheet metal panel and the patterned upper sheet metal panel have a plurality of aligned bolt holes.

A vehicle battery system housing includes a bottom panel including a patterned upper sheet metal panel including a planar section and having a plurality of upwardly protruding portions defining first strengthening crossbar sections extending upward from the planar section. A patterned lower sheet metal panel secured to a bottom surface of the patterned upper sheet metal panel, the patterned lower sheet metal panel having a plurality of protruding portions defining second strengthening crossbar sections. A sidewall structure mounted to the bottom panel.

According to a further aspect of the present disclosure, the patterned upper and lower sheet metal panel is made from one of steel, aluminum, titanium, magnesium and composites thereof.

According to a further aspect of the present disclosure, the patterned lower sheet metal panel is secured to the bottom surface of the patterned upper sheet metal panel by welds.

According to a further aspect of the present disclosure, the patterned lower sheet metal panel includes a plurality of drain holes therein.

According to a further aspect of the present disclosure, the patterned lower sheet metal panel and the patterned upper sheet metal panel have a plurality of aligned bolt holes.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
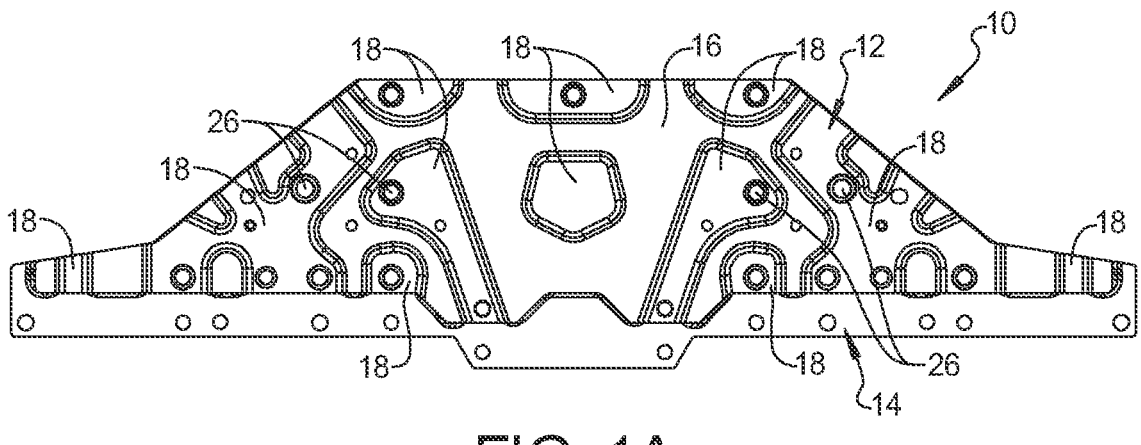
FIG. 1A is a top plan view of a shear panel construction according to a first example embodiment.
Figure 6:
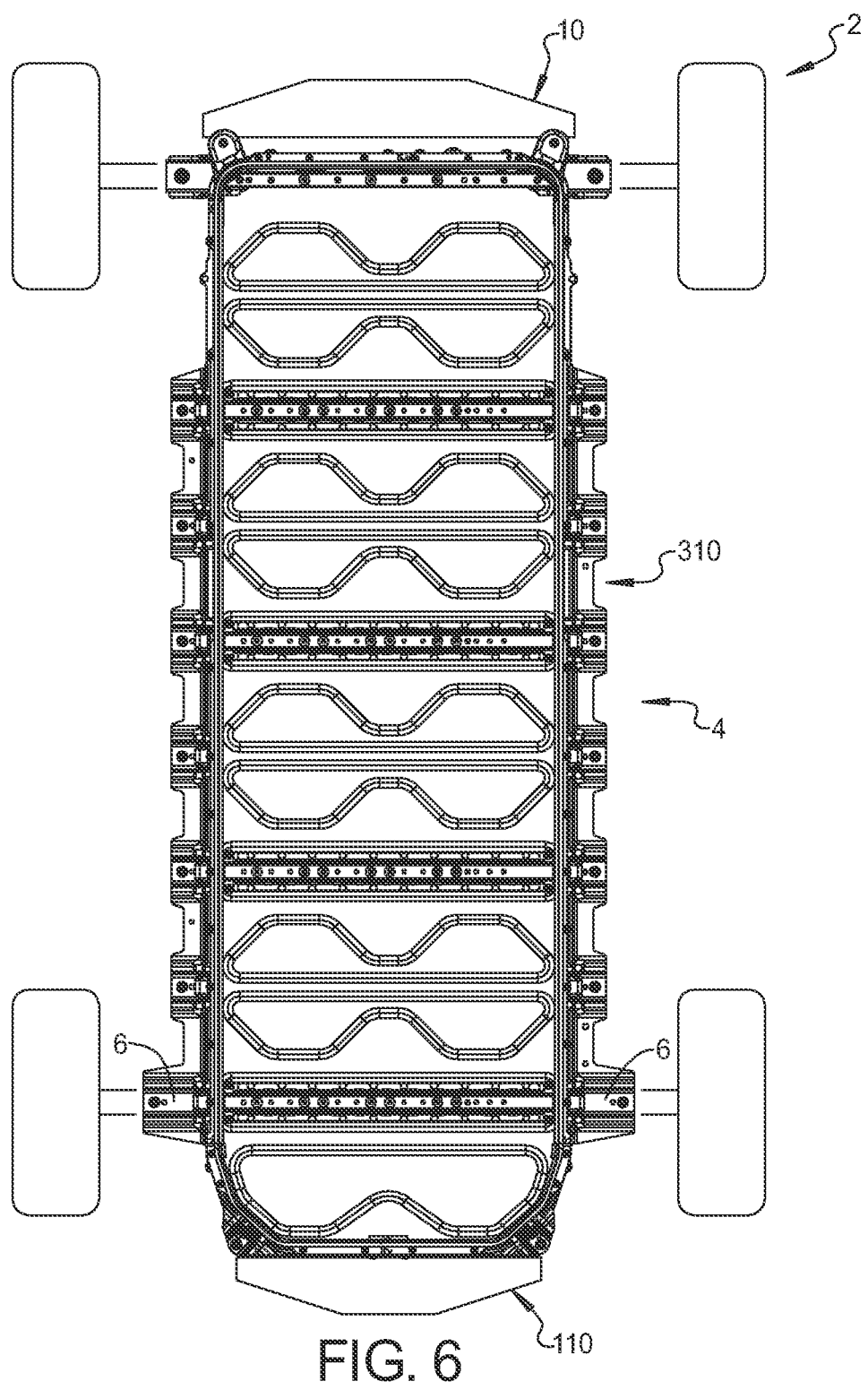
FIG. 6 is a schematic view of a vehicle undercarriage having a front shear plate, a rear shear plate and a battery system having a bottom plate mounted to a vehicle frame according to the principles of the present disclosure.

With reference to FIG. 1A a top plan view of a shear panel construction 10 is shown. The shear panel construction 10 can be a front shear plate of an electric vehicle undercarriage structure. With reference to FIG. 6, the front shear plate 10 is typically a bottom undercarriage panel (skid plate) of an electric vehicle 2 that is secured to the vehicle frame 6 forward of the battery module 4. The shear panel construction 10 includes a patterned upper sheet metal panel 12 that is secured to a patterned lower sheet metal panel 14. The patterned upper sheet metal panel 12 includes a planar section 16 and a plurality of strengthening crossbar sections 18 that protrude upward from the planar section 16. The plurality of strengthening crossbar sections 18 provide the patterned upper sheet metal panel 12 with bending strength that enable the elimination of separate stringer (strengthening) components. The plurality of strengthening crossbar sections 18 are arranged on the patterned upper sheet metal panel 12 to facilitate continuous flow of water and other liquids to an edge of the patterned upper sheet metal panel 12. In particular, the entire planar section 16 of the patterned upper sheet metal panel 12 has a drainage path to an edge of the patterned upper sheet metal panel 12 so that liquids are not blocked from flowing off of an upper surface of the patterned upper sheet metal panel 12. The plurality of strengthening crossbar sections 18 can be arranged symmetrically relative to a centerline and are irregular shaped with widening and narrowing regions. The plurality of strengthening crossbar sections 18 can extend laterally, longitudinally and diagonally across the shear panel construction 10.

Figure 1B:
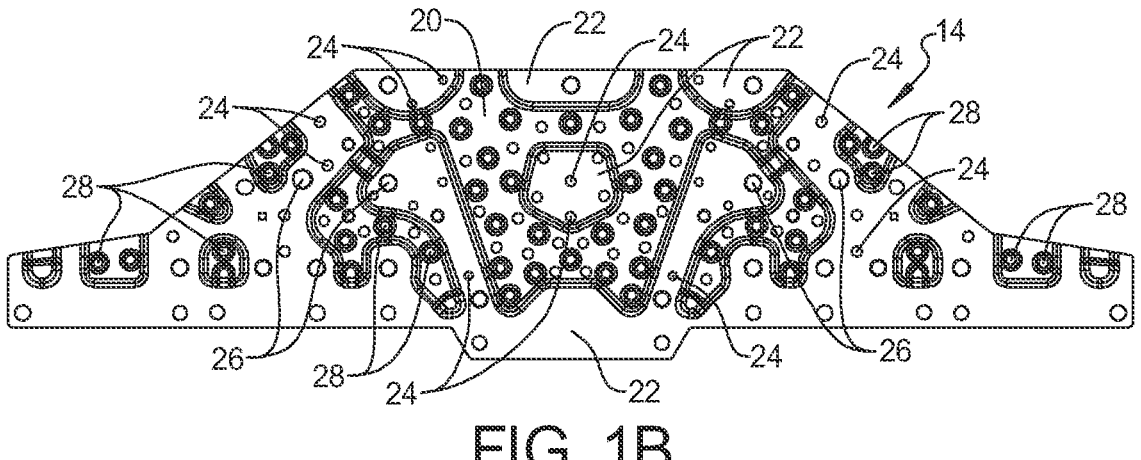
FIG. 1B is a bottom plan view of a patterned lower sheet metal panel of the shear panel construction of FIG. 1A.

The patterned lower sheet metal panel 14 can be secured to the patterned upper sheet metal panel 12 by welds, laser welds, rivets, adhesives or combinations thereof. With reference to the bottom plan view of the patterned lower sheet metal panel 14 in FIG. 1B, the patterned lower sheet metal panel 14 includes a planar section 20 and a plurality of strengthening crossbar sections 22 that protrude downward from the planar section 20. The plurality of strengthening crossbar sections 22 provide the patterned lower sheet metal panel 14 with bending strength that enable the elimination of separate stringer (strengthening) components. The patterned lower sheet metal panel 14 further includes a plurality of ELPO water drainage holes 24 that allow drainage of E-coat material. The patterned lower sheet metal panel 14 further includes a plurality of castellations (raised regions) 28 for welds between the patterned lower sheet metal panel 14 and the patterned upper sheet metal panel 12. The patterned upper sheet metal panel 12 and the patterned lower sheet metal panel 14 each include aligned mounting holes 26. In the embodiment of FIGS. 1A and 1B, the pattern of the strengthening cross bar sections 18 and 22 of the upper and lower sheet metal panels 12, 14 are nearly identical.

The patterned upper sheet metal panel 12 and the patterned lower sheet metal panel 14 can be made from steel, aluminum, titanium, magnesium or other composites thereof. The patterned upper sheet metal panel 12 and the patterned lower sheet metal panel 14 can be made from the same or different ones of the above materials. By way of non-limiting example, the steel can be 210B2, 340LA, DP600 or 980 steel with a thickness of between 0.5 and 2 mm and more preferably between 1 and 1.5 mm and the aluminum can be 3003, 6061, 6082, S650 or 7075 aluminum with a thickness of between 1 and 5 mm and preferably between 1.5 and 3 mm. The plate separation can be between 5-40 mm, 10-30 mm and more preferably between 11 and 25 mm. The plate separation is based upon the protrusion amount of the strengthening crossbar sections 18. The plate separation, the thickness and the material of the patterned upper sheet metal panel 12 and the patterned lower sheet metal panel 14 can also be chosen based upon the required buckling load factor, weight and space limitations for the specific application.

Figure 2A:
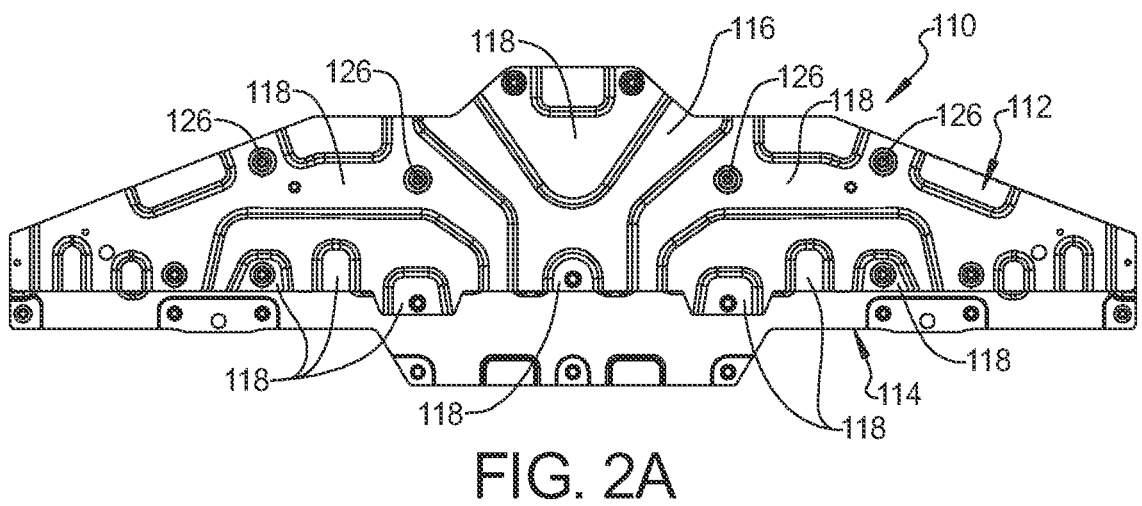
FIG. 2A is a top plan view of a shear panel construction according to a second example embodiment.

According to an alternative embodiment as shown in FIG. 2A, a top plan view of a shear panel construction 110 is shown. The shear panel construction 110 can be a rear shear plate of an electric vehicle undercarriage structure. With reference to FIG. 6, the front shear plate 110 is typically a bottom undercarriage panel (skid plate) of an electric vehicle 2 that is secured to the vehicle frame 6 rearward of the battery module 4. The shear panel construction 110 includes a patterned upper sheet metal panel 112 that is secured to a patterned lower sheet metal panel 114. The patterned upper sheet metal panel 112 includes a planar section 116 and a plurality of strengthening crossbar sections 118 that protrude upward from the planar section 116. The plurality of strengthening crossbar sections 118 have an alternative pattern to the strengthening crossbar sections 118 shown in FIG. 1A, and provide the patterned upper sheet metal panel 112 with bending strength that enable the elimination of separate stringer (strengthening) components. The plurality of strengthening crossbar sections 118 are arranged on the patterned upper sheet metal panel 112 to facilitate continuous flow of water and other liquids to an edge of the patterned upper sheet metal panel 112. In particular, the entire planar section 116 of the patterned upper sheet metal panel 112 has a drainage path to an edge of the patterned upper sheet metal panel 112 so that liquids are not blocked from flowing off of the patterned upper sheet metal panel 112. The plurality of strengthening crossbar sections 118 can be arranged symmetrically relative to a centerline and are irregular shaped with widening and narrowing regions. The plurality of strengthening crossbar sections 118 can extend laterally, longitudinally and diagonally across the shear panel construction 110.

Figure 2B:
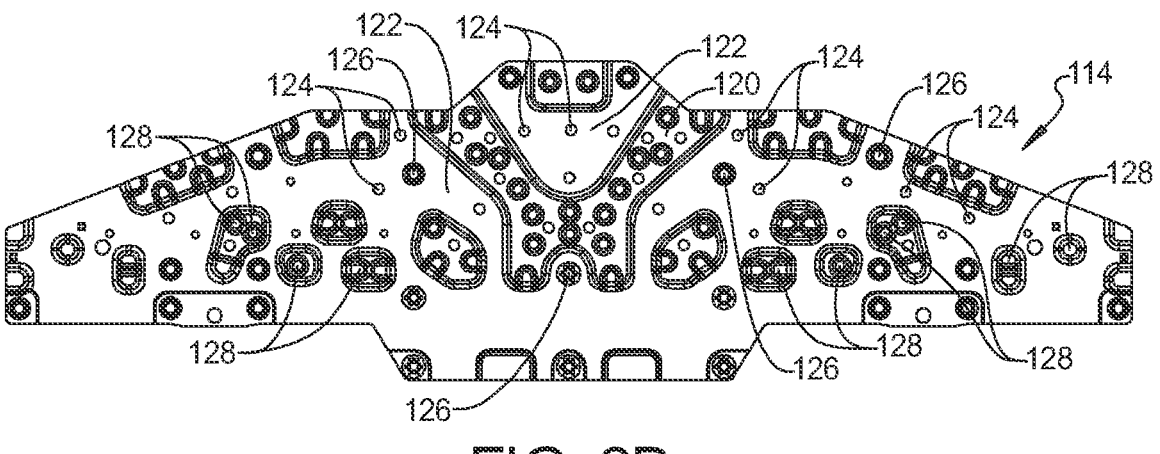
FIG. 2B is a bottom plan view of a patterned lower sheet metal panel of the shear panel construction of FIG. 2A.

The patterned lower sheet metal panel 114 can be secured to the patterned upper sheet metal panel 112 by spot welds, laser welds, rivets, adhesives or combinations thereof. With reference to the bottom plan view of the patterned lower sheet metal panel 14 in FIG. 2B, the patterned lower sheet metal panel 114 includes a planar section 120 and a plurality of strengthening crossbar sections 122 that protrude downward from the planar section 120. The plurality of strengthening crossbar sections 122 provide the patterned lower sheet metal panel 114 with bending strength that enable the elimination of separate stringer (strengthening) components. The patterned lower sheet metal panel 114 further includes a plurality of ELPO water drainage holes 124. The patterned lower sheet metal panel 114 further includes a plurality of castellations 128 (raised regions) for welds between the patterned lower sheet metal panel 114 and the patterned upper sheet metal panel 112. The patterned upper sheet metal panel 112 and the patterned lower sheet metal panel 114 each include aligned mounting holes 126. In the embodiment of FIGS. 2A and 2B, the pattern of the strengthening cross bar sections 118 and 122 of the upper and lower sheet metal panels 112, 114 have areas with similarities and areas with differences.

Figure 3A:
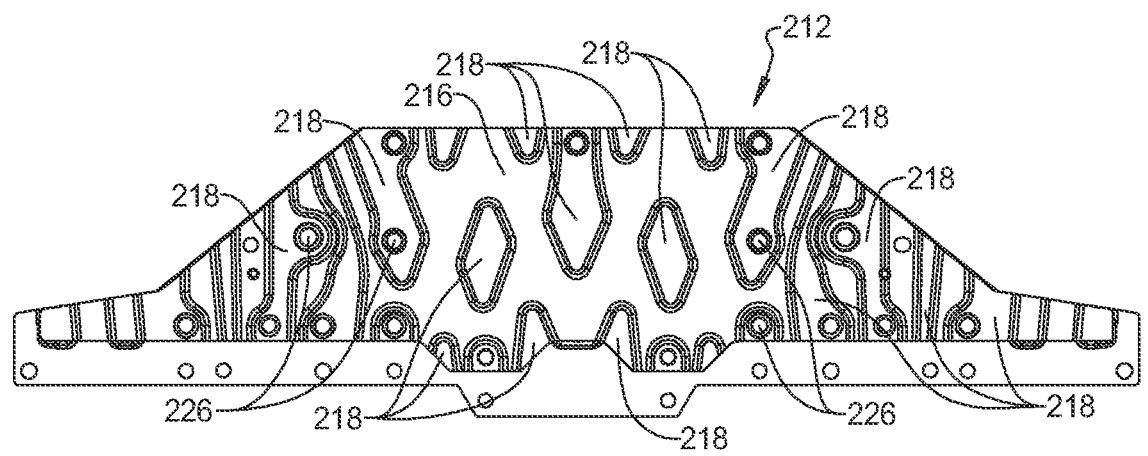
FIG. 3A is a top plan view of a patterned upper sheet metal panel of a shear panel construction according to a third example embodiment.
Figure 3B:
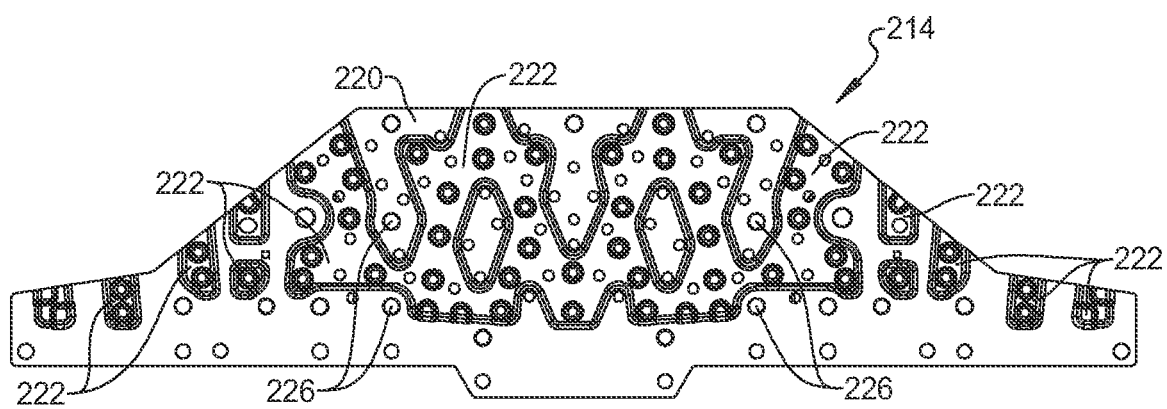
FIG. 3B is a bottom plan view of a patterned lower sheet metal panel of the shear panel construction of FIG. 3A.

According to an alternative embodiment as shown in FIG. 3A, a top plan view of a patterned upper sheet metal panel 212 of a shear panel construction is shown. The shear panel construction can be a front shear plate of an electric vehicle undercarriage structure. The rear shear plate is typically a bottom panel of the electric vehicle undercarriage that is secured to the vehicle frame 6 rearward of the battery module 4. The shear panel construction includes a patterned upper sheet metal panel 212 that is secured to a patterned lower sheet metal panel 214 (FIG. 3B). The patterned upper sheet metal panel 212 includes a planar section 216 and a plurality of strengthening crossbar sections 218 that protrude upward from the planar section 216. The plurality of strengthening crossbar sections 218 have an alternative pattern to the strengthening crossbar sections 218 shown in FIG. 3A, and provide the patterned upper sheet metal panel 212 with bending strength that enable the elimination of separate stringer (strengthening) components. The plurality of strengthening crossbar sections 218 are arranged on the patterned upper sheet metal panel 212 to facilitate continuous flow of water and other liquids to an edge of the patterned upper sheet metal panel 212. In particular, the entire planar section 216 of the patterned upper sheet metal panel 212 has a drainage path to an edge of the patterned upper sheet metal panel 212 so that liquids are not blocked from flowing off of the patterned upper sheet metal panel 212. The plurality of strengthening crossbar sections 218 can be arranged symmetrically relative to a centerline and are irregular shaped with widening and narrowing regions. The plurality of strengthening crossbar sections 218 can extend laterally, longitudinally and diagonally across the shear panel construction.

The patterned lower sheet metal panel 214 can be secured to the patterned upper sheet metal panel 212 by spot welds, laser welds, rivets, adhesives or combinations thereof. With reference to the bottom plan view of the patterned lower sheet metal panel 14 in FIG. 2B, the patterned lower sheet metal panel 214 includes a planar section 222 and a plurality of strengthening crossbar sections 220 that protrude downward from the planar section 222. The plurality of strengthening crossbar sections 220 provide the patterned lower sheet metal panel 214 with bending strength that enable the elimination of separate stringer (strengthening) components. The patterned lower sheet metal panel 214 further includes a plurality of ELPO water drainage holes 224. The patterned lower sheet metal panel 214 further includes a plurality of castellations 228 (raised regions) for welds between the patterned lower sheet metal panel 214 and the patterned upper sheet metal panel 212. The patterned upper sheet metal panel 212 and the patterned lower sheet metal panel 214 each include aligned mounting holes 226. In the embodiment of FIGS. 2A and 2B, the pattern of the strengthening cross bar sections 220 of the patterned lower sheet metal panel 214 correspond substantially to the planar section of the patterned upper sheet metal panel 212.

Figure 4A:
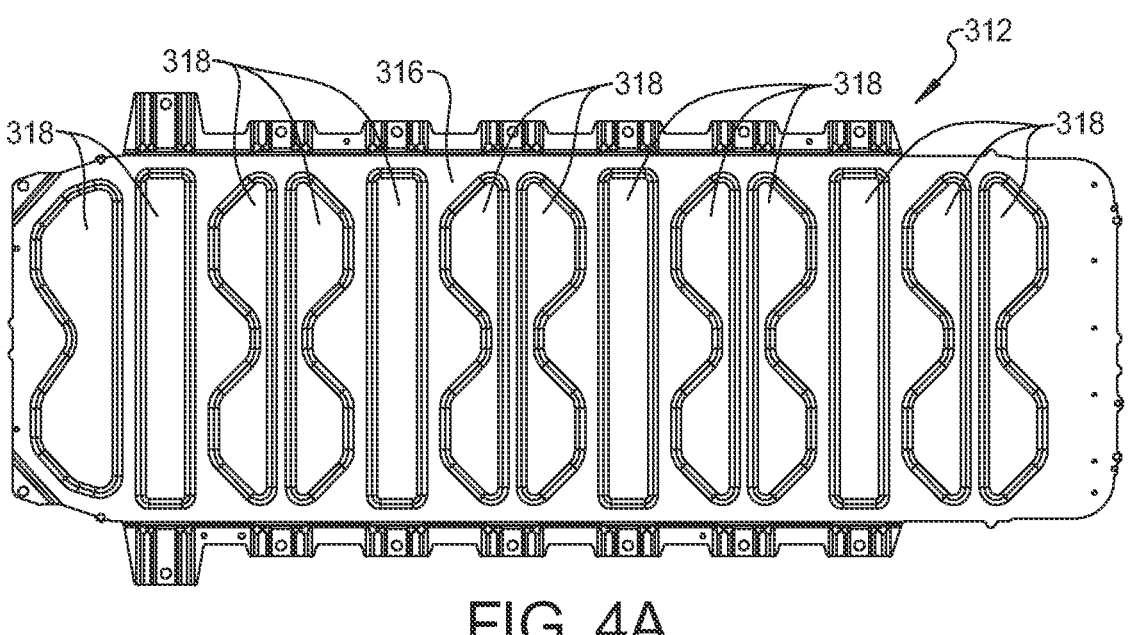
FIG. 4A is a top plan view of a shear panel construction according to a second example embodiment.
Figure 4B:
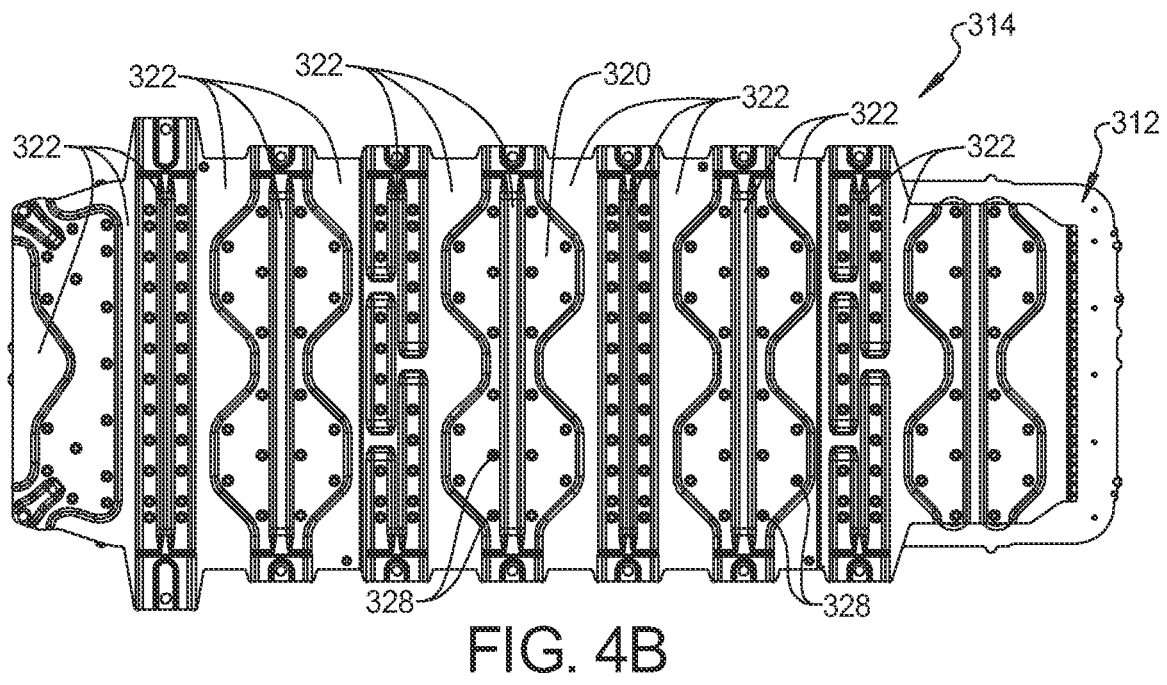
FIG. 4B is a bottom plan view of a patterned lower sheet metal panel of the shear panel construction of FIG. 4A.

According to an alternative embodiment as shown in FIG. 4A, is a top plan view of a patterned upper sheet metal panel 312 of a shear panel construction 310. The shear panel construction 310 can be a bottom plate of a battery system housing 4 of an electric vehicle 2, as shown in FIG. 6. The shear panel construction 310 includes a patterned upper sheet metal panel 312 that is secured to a patterned lower sheet metal panel 314 (FIG. 4B). The patterned upper sheet metal panel 312 includes a planar section 318 and a plurality of strengthening crossbar sections 316 that protrude upward from the planar section 318. The plurality of strengthening crossbar sections 316 provide the patterned upper sheet metal panel 312 with bending strength that enable the elimination of separate stringer (strengthening) components.

The patterned lower sheet metal panel 314 can be secured to the patterned upper sheet metal panel 312 by spot welds, laser welds, rivets, adhesives or combinations thereof. With reference to the bottom plan view of the patterned lower sheet metal panel 314 in FIG. 4B, the patterned lower sheet metal panel 314 includes a planar section 320 and a plurality of strengthening crossbar sections 322 that protrude downward from the planar section 320. The plurality of strengthening crossbar sections 322 provide the patterned lower sheet metal panel 314 with bending strength that enable the elimination of separate stringer (strengthening) components. The patterned lower sheet metal panel 314 further can include a plurality of ELPO drainage holes. The patterned lower sheet metal panel 314 further includes a plurality of castellations 328 (raised regions) for welds between the patterned lower sheet metal panel 314 and the patterned upper sheet metal panel 312. The patterned upper sheet metal panel 312 and the patterned lower sheet metal panel 314 each include aligned mounting holes 326.

Figure 5:
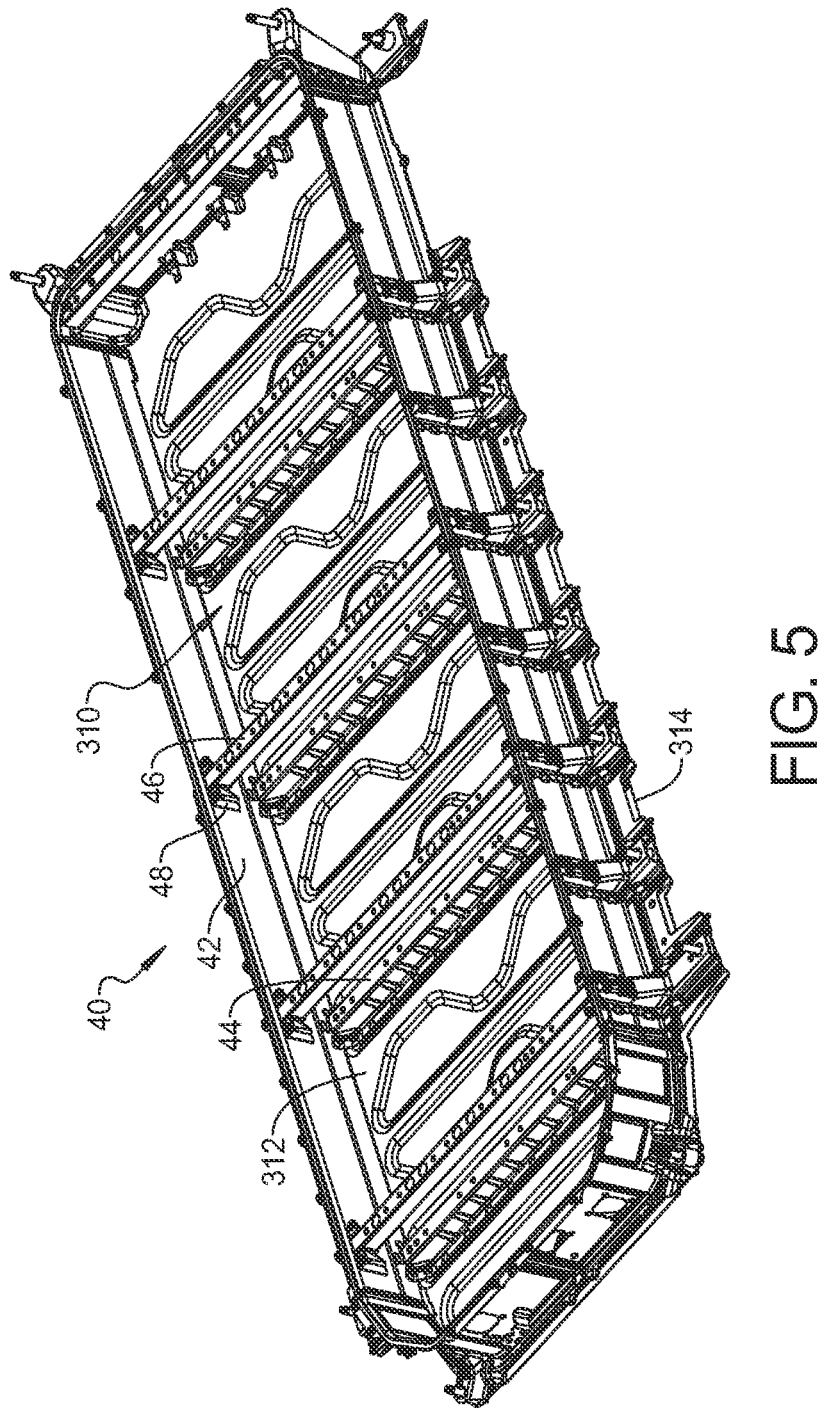
FIG. 5 is a perspective view of an example battery housing with a bottom surface formed from a shear panel constructions according to the principles of the present disclosure.

With reference to FIG. 5, a portion of a battery module mounting system 40 in which the bottom panel 310 of the battery module mounting system 40 is formed by the patterned upper sheet metal panel 312 and the patterned lower sheet metal panel 314 is shown. The battery module mounting system 40 includes a sidewall structure 42 mounted to the bottom panel 310 and having lower cross bars 44 welded to the bottom panel 310. Additional upper cross bars 46 are supported by brackets 48 that are welded to the sidewall structure 42. Battery modules, not shown are received between the lower cross bars 44 and additional stacked battery modules (not shown) are received between the upper cross bars 46.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A vehicle shear panel construction, comprising:
a one piece patterned upper sheet metal panel including a planar section and having a plurality of integrally formed upwardly protruding portions defining first strengthening crossbar sections extending upward from the planar section, wherein the planar section of the one piece patterned upper sheet metal panel extends to an edge of the one piece patterned upper sheet metal panel; and
a one piece patterned lower sheet metal panel secured directly to a bottom surface of the patterned upper sheet metal panel, the one piece patterned lower sheet metal panel having a planar section and a plurality of integrally formed downwardly protruding portions defining second strengthening crossbar sections, wherein the planar section of the one piece patterned upper sheet metal panel is spot welded to the planar section of the one piece patterned lower sheet metal panel.

2. The vehicle shear panel construction according to claim 1, wherein the one piece patterned upper sheet metal panel is made from one of steel, aluminum, titanium, magnesium and composites thereof.

3. The vehicle shear panel construction according to claim 2, wherein the one piece patterned lower sheet metal panel is made from one of steel, aluminum, titanium, magnesium and composites thereof.

4. The vehicle shear panel construction according to claim 1, wherein the first plurality of strengthening crossbar sections are arranged on the one piece patterned upper sheet metal panel to facilitate continuous flow of water and other liquids to an edge of the one piece patterned upper sheet metal panel and the one piece patterned lower sheet metal panel includes a plurality of drain holes therein.

5. The vehicle shear panel construction according to claim 1, wherein the one piece patterned lower sheet metal panel and the one piece patterned upper sheet metal panel have a plurality of aligned bolt holes.

6. The vehicle shear panel construction according to claim 1, wherein the first strengthening crossbar sections are irregular shaped with widening and narrowing regions and wherein the first strengthening cross bar sections are symmetric about a centerline of the one piece patterned upper sheet metal panel.

7. A vehicle underbody construction, comprising:
a vehicle frame;
a shear panel construction including a one piece patterned upper sheet metal panel including a planar section and having a plurality of upwardly protruding portions defining first strengthening crossbar sections extending upward from the planar section, wherein the planar section of the one piece patterned upper sheet metal panel extends to an edge of the one piece patterned upper sheet metal panel and a one piece patterned lower sheet metal panel secured directly to a bottom surface of the one piece patterned upper sheet metal panel, the one piece patterned lower sheet metal panel having a planar section and a plurality of integrally formed downwardly protruding portions defining second strengthening crossbar sections, wherein the planar section of the one piece patterned upper sheet metal panel is spot welded to the planar section of the one piece patterned lower sheet metal panel.

8. The vehicle underbody construction according to claim 7, wherein the one piece patterned upper sheet metal panel is made from one of steel, aluminum, titanium, magnesium and composites thereof.

9. The vehicle underbody construction according to claim 8, wherein the one piece patterned lower sheet metal panel is made from one of steel, aluminum, titanium, magnesium and composites thereof.

10. The vehicle underbody construction according to claim 7, wherein the first plurality of strengthening crossbar sections are arranged on the one piece patterned upper sheet metal panel to facilitate continuous flow of water and other liquids to an edge of the one piece patterned upper sheet metal panel and the one piece patterned lower sheet metal panel includes a plurality of drain holes therein.

11. The vehicle underbody construction according to claim 7, wherein the one piece patterned lower sheet metal panel and the one piece patterned upper sheet metal panel have a plurality of aligned bolt holes.

12. The shear panel construction according to claim 7, wherein the first strengthening crossbar sections are irregular shaped with widening and narrowing regions and wherein the first strengthening cross bar sections are symmetric about a centerline of the one piece patterned upper sheet metal panel.

13. A vehicle battery system housing, comprising: a bottom panel including a one piece patterned upper sheet metal panel including a planar section and having a plurality of upwardly protruding portions defining first strengthening crossbar sections extending upward from the planar section, wherein the planar section of the one piece patterned upper sheet metal panel extends to an edge of the one piece patterned upper sheet metal panel, a one piece patterned lower sheet metal panel secured directly to a bottom surface of the one piece patterned upper sheet metal panel, the one piece patterned lower sheet metal panel having a planar section and a plurality of integrally formed downwardly protruding portions defining second strengthening crossbar sections, wherein the planar section of the one piece patterned upper sheet metal panel is spot welded to the planar section of the one piece patterned lower sheet metal panel; and a sidewall structure connected to the bottom panel.

14. The vehicle battery system housing according to claim 13, wherein the one piece patterned upper sheet metal panel is made from one of steel, aluminum, titanium, magnesium and composites thereof.

15. The vehicle battery system housing according to claim 14, wherein the one piece patterned lower sheet metal panel is made from one of steel, aluminum, titanium, magnesium and composites thereof.

16. The vehicle battery system housing according to claim 13, wherein the one piece patterned lower sheet metal panel is secured to the bottom surface of the one piece patterned upper sheet metal panel by welds.

17. The vehicle battery system housing according to claim 13, wherein the first plurality of strengthening crossbar sections are arranged on the one piece patterned upper sheet metal panel to facilitate continuous flow of water and other liquids to the edge of the one piece patterned upper sheet metal panel and the one piece patterned lower sheet metal panel includes a plurality of drain holes therein.

18. The vehicle battery system housing according to claim 13, wherein the one piece patterned lower sheet metal panel and the one piece patterned upper sheet metal panel have a plurality of aligned bolt holes.

\*   \*   \*   \*   \*